(12) United States Patent
Sobeck et al.

(10) Patent No.: US 10,068,013 B2
(45) Date of Patent: Sep. 4, 2018

(54) TECHNIQUES FOR FOCUSED CRAWLING

(71) Applicant: Samsung Electronics Co., Ltd., Suwon-si, Gyeonggi-do (KR)

(72) Inventors: David Sobeck, San Francisco, CA (US); Jonathan Ben-Tzur, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 14/309,781

(22) Filed: Jun. 19, 2014

(65) Prior Publication Data

US 2015/0370901 A1 Dec. 24, 2015

(51) Int. Cl.
*G06F 17/30* (2006.01)

(52) U.S. Cl.
CPC .............................. *G06F 17/30864* (2013.01)

(58) Field of Classification Search
CPC ......... G06F 17/30867; G06F 17/30861; G06F 17/30864
USPC .................................................. 707/709–712
See application file for complete search history.

(56) References Cited

U.S. PATENT DOCUMENTS

| 6,594,694 | B1 | 7/2003 | Najork et al. | |
|---|---|---|---|---|
| 8,185,463 | B1* | 5/2012 | Ball | G06Q 40/00 705/2 |
| 2002/0103823 | A1 | 8/2002 | Jackson et al. | |
| 2006/0129463 | A1 | 6/2006 | Zicherman | |
| 2008/0235187 | A1* | 9/2008 | Gade | G06F 17/3064 |
| 2010/0198770 | A1* | 8/2010 | Sengamedu | G06N 99/005 706/52 |
| 2011/0078556 | A1* | 3/2011 | Prasad | G06F 9/4443 715/234 |
| 2011/0225142 | A1* | 9/2011 | McDonald | G06F 21/552 707/710 |
| 2012/0011095 | A1* | 1/2012 | Ahrens | G06F 17/30867 706/47 |
| 2012/0109931 | A1* | 5/2012 | Prasad | G06F 11/3672 707/709 |
| 2012/0259833 | A1* | 10/2012 | Paduroiu | G06F 17/30864 707/709 |
| 2013/0041881 | A1* | 2/2013 | Wierman | G06F 17/30864 707/709 |

(Continued)

OTHER PUBLICATIONS

International Search Report and Written Opinion for PCT Application No. PCT/US2015/036307 dated Sep. 17, 2015.

*Primary Examiner* — Hares Jami
(74) *Attorney, Agent, or Firm* — Jefferson IP Law, LLP

(57) ABSTRACT

In some embodiments, a user interface module may be configured to assist a user in defining a set of states and a set of transitions, each transition of the set of transitions linking two states of the set of states, the set of states and the set of transitions defining a path to a target state, each state of the set of states being a web page, each transition of the set of transitions defining an interaction with an interactive element. A navigation instruction generation module may be configured to generate navigation instructions based on the set of states and the set of transitions. A focused crawler module may be configured to navigate to the target state based on the navigation instructions. A scraper module may be configured to copy information from the target state in response to the focused crawler module navigating to the target state.

19 Claims, 10 Drawing Sheets

(56) References Cited

U.S. PATENT DOCUMENTS

| | | | |
|---|---|---|---|
| 2014/0052433 A1* | 2/2014 | Prasad | G06F 8/74 703/22 |
| 2014/0081946 A1* | 3/2014 | Choudhary | G06F 17/30864 707/709 |
| 2014/0136508 A1* | 5/2014 | Lyngbaek | G06F 17/30887 707/709 |

* cited by examiner

Welcome To Restaurant Reviews

Search

US Cities 504

| | | | |
|---|---|---|---|
| Albuquerque | Des Moines | Miami | Richmond |
| Anchorage | Detroit | Milwaukee | Rochester |
| Atlanta | Fort Worth | Minneapolis | SF Bay Area |
| Austin | Fresno | Nashville | Sacramento |
| Baltimore | Green Bay | New Orleans | Salt Lake City |
| Baton Rouge | Hampton Roads | New York | San Antonio |
| Birmingham | Hartford | Oakland | San Diego |
| Boston | Houston | Oklahoma City | San Francisco |
| Buffalo | Indianapolis | Orange County | San Jose |
| Charleston | Jacksonville | Orlando | Santa Barbara |
| Charlotte | Kansas City | Philadelphia | Seattle |
| Chicago | Knoxville | Phoenix | St. Louis |
| Cincinnati | Las Vegas | Pittsburgh | Tampa Bay |
| Cleveland | Lexington | Portland | Tucson |
| Columbus | Los Angeles | Providence | Tulsa |
| Dallas/Fort Worth | Louisville | Raleigh | Twin Cities |
| Denver | Memphis | Research Triangle | Washington DC |

Advertisements

FIG. 5

Restaurant Reviews – Albuquerque

Filter Results:

Cuisine ▼ Prices ▼ Neighborhoods ▼ Features ▼

Academy Hills Restaurants — 704a

Dion's — 704a
- Pizza, Sandwiches

Dragon Wok — 704b
- Chinese

Five Star Burgers — 704c
- American, Burgers

Flying Star Café — 704d
- American, Coffee, Vegan

Jinja Bar & Bistro — 704e
- Asian, International

La Quiche — 704f
Parisienne Bistro — 704g
- Bakery, Breakfast

Pop Pop's Italian Ice — 704h
- Desserts/Ice Cream

Tim's Place — 704h
- American, Breakfast

Whole Hog Cafe — 704i
- American, Barbecue

...

Search

Map

Most Popular in Academy Hills

1. First Restaurant
2. Second Restaurant
3. Third Restaurant

...

Advertisement

Critical Reviews
1. First Review
2. Second Review
3. Third Review
...

Links
1. First Link
2. Second Link
3. Third Link
...

FIG. 7

TECHNIQUES FOR FOCUSED CRAWLING

TECHNICAL FIELD

The disclosure generally relate to crawling network sites. More particularly, the invention(s) relate to techniques for a focused crawl of network sites.

BACKGROUND

As both usage of the Internet and the number of web pages on the Internet grows, there is an increasing need to provide relevant information. A general web crawler is often used to find information for presentation to users. A general web crawler typically browses the Internet for the purpose of indexing. Further, they are often utilized with web scrapers to copy pages for later processing by a search engine.

A general web crawler starts with a list of universal resource locators (seed URLs) to visit. As the general web crawler visits the seed URLs, the crawler identifies all hyperlinks in the page and adds them to a list of hyperlinks (e.g., a list of URLs) to visit. Web scrapers typically scrape the pages that the general web crawler visits.

Unfortunately, general web crawlers may disproportionately utilize web site resources when compared to normal traffic. For example, crawling all URLs on a web page and scraping the crawled pages may require significant resources from one or more hosting web servers. As the number of general web crawlers increase, resource requirements to service the demand will likely impact a hosting web server's ability to provide service to individual users.

Further, many hosting web servers value the information that is provided on the hosted web pages and may wish to guard against excessive scraping of that information. For example, many web sites generate advertisement revenue by encouraging users to visit their sites by providing aggregate valuable information (e.g., reviews). As a result, operators of hosted web servers may limit scraping of information from their web pages.

Techniques that operators of hosted web servers may utilize to limit scraping of information include, for example, rate limiting, monthly limits, and total limits. A web server that utilizes rate limiting limits the number of times a site or set of web pages is visited by a particular IP address or particular machine over a short period of time (e.g., over a second or minute). A web server that utilizes monthly limits utilizes a process that is similar to rate limiting but over a longer period of time (e.g., over a month). For example, a web server may utilize rate limiting to eliminate spikes of requests from a particular device over a short period of time. A web server may utilize monthly limits (or limits over a predetermined period of time not necessarily monthly) to eliminate a volume of visits that may fall below rate limiting but that indicate that the behavior is not consumer or customer behavior. A web server that utilizes total limits utilizes a process that limits the total visits over any period of time.

Another technique an operator of a hosted web server may utilize to identify and blacklist visitors is the use of honeypots. In one example, a honeypot is a link that may not be viewable from a web page (e.g., there is a link encoded in the page that has no width or otherwise is not displayable on the web page or a link that is dynamically changing due to javascripting). Since a general web crawler typically scans a web page's code for links, the general web crawler may crawl the honeypot link thereby allowing the operator of the hosted web server to identify and blacklist the general web crawler.

As a result of these techniques and others, general web crawlers are often limited in their ability to acquire information.

SUMMARY OF EMBODIMENTS

In some embodiments, a system comprises a user interface module, a navigation instruction generation module, a focused crawler module, and a scraper module. The user interface module may be configured to assist a user in defining a set of states and a set of transitions, each transition of the set of transitions linking two states of the set of states, the set of states and the set of transitions defining a path to a target state, each state of the set of states being a web page, each transition of the set of transitions defining an interaction with an interactive element. The navigation instruction generation module may be configured to generate navigation instructions based on the set of states and the set of transitions. The focused crawler module may be configured to navigate to the target state based on the navigation instructions. The scraper module may be configured to copy information from the target state in response to the focused crawler module navigating to the target state.

In various embodiments, the system may comprise a processor and memory. The user interface module, navigation instruction generation module, focused crawler module, and/or the scraper module may be resident in memory. In some embodiments, the user interface module controls the processor to assist a user in defining a set of states and a set of transitions, each transition of the set of transitions linking two states of the set of states, the set of states and the set of transitions defining a path to a target state, each state of the set of states being a web page, each transition of the set of transitions defining an interaction with an interactive element. The navigation instruction generation module may control the processor to generate navigation instructions based on the set of states and the set of transitions. The focused crawler module may control the processor to navigate to the target state based on the navigation instructions. The scraper module may control the processor to copy information from the target state in response to the focused crawler module navigating to the target state.

The target state may be a web page at a particular time. In some embodiments, the user interface module utilizes a graphical user interface. In various embodiments, each state of the set of states is represented as an object (e.g., a software object or a GUI object) and each transition of the set of states is represented as being coupled to at least two GUI objects.

Each transition of the set of transitions defining the interaction with the interactive element may comprise at least two states of the set of states defining at least one interaction with different interactive elements. The interactive element may be at least one of a link, a scroll bar, a button, a radio button, a pull down, a mouseover object, check box, cycle button, slider, and list box. The interactive element may be a functional component of at least one state.

In some embodiments, the scraper module configured to copy information from the target state comprises the scraper module configured to copy a subset of information (e.g., some but not all information) from the target state. The system may further comprise a crawler control module configured to control the focused crawler module to provide confidence that visits to at least one state does not exceed a limit threshold. In some embodiments, the navigation instruction generation module stores the generated navigation instructions.

An exemplary method may comprise defining a set of states and a set of transitions, each transition of the set of transitions linking two states of the set of states. The set of states and the set of transitions define a path to a target state and each state of the set of states being a web page. Each transition of the set of transitions may define an interaction with an interactive element. The method may further comprise generating navigation instructions based on the set of states and the set of transitions, navigating to the target state based on the navigation instructions, and copying information from the target state in response to navigating to the target state.

An exemplary non-transitory computer readable medium may comprise executable instructions. The instructions may be executable by a processor to perform a method. The method may comprise defining a set of states and a set of transitions, each transition of the set of transitions linking two states of the set of states. The set of states and the set of transitions define a path to a target state and each state of the set of states being a web page. Each transition of the set of transitions may define an interaction with an interactive element. The method may further comprise generating navigation instructions based on the set of states and the set of transitions, navigating to the target state based on the navigation instructions, and copying information from the target state in response to navigating to the target state.

In various embodiments, a system comprises a user interface module, a navigation instruction generation module, a focused crawler module, and a scraper module. The user interface module may be configured to assist a user in defining a set of states and a set of transitions, each transition of the set of transitions linking two states of the set of states, the set of states and the set of transitions defining a path to a target state, each state of the set of states being a web page or a network file. Each transition of the set of transitions may define an interaction with an interactive element. The navigation instruction generation module may be configured to generate navigation instructions based on the set of states and the set of transitions. The focused crawler module may be configured to navigate to the target state based on the navigation instructions. The scraper module may be configured to copy information from the target state in response to the focused crawler module navigating to the target state. In some embodiments, the state may include any number of web pages or any number of network files. The state may include any number of both web pages and network files.

BRIEF DESCRIPTION OF THE DRAWINGS

FIG. 5 is a depiction of a seed state in some embodiments.

FIG. 7 is a depiction of another intermediate state linked to a plurality of target states in some embodiments.

DETAILED DESCRIPTION OF EMBODIMENTS

Figure 1:
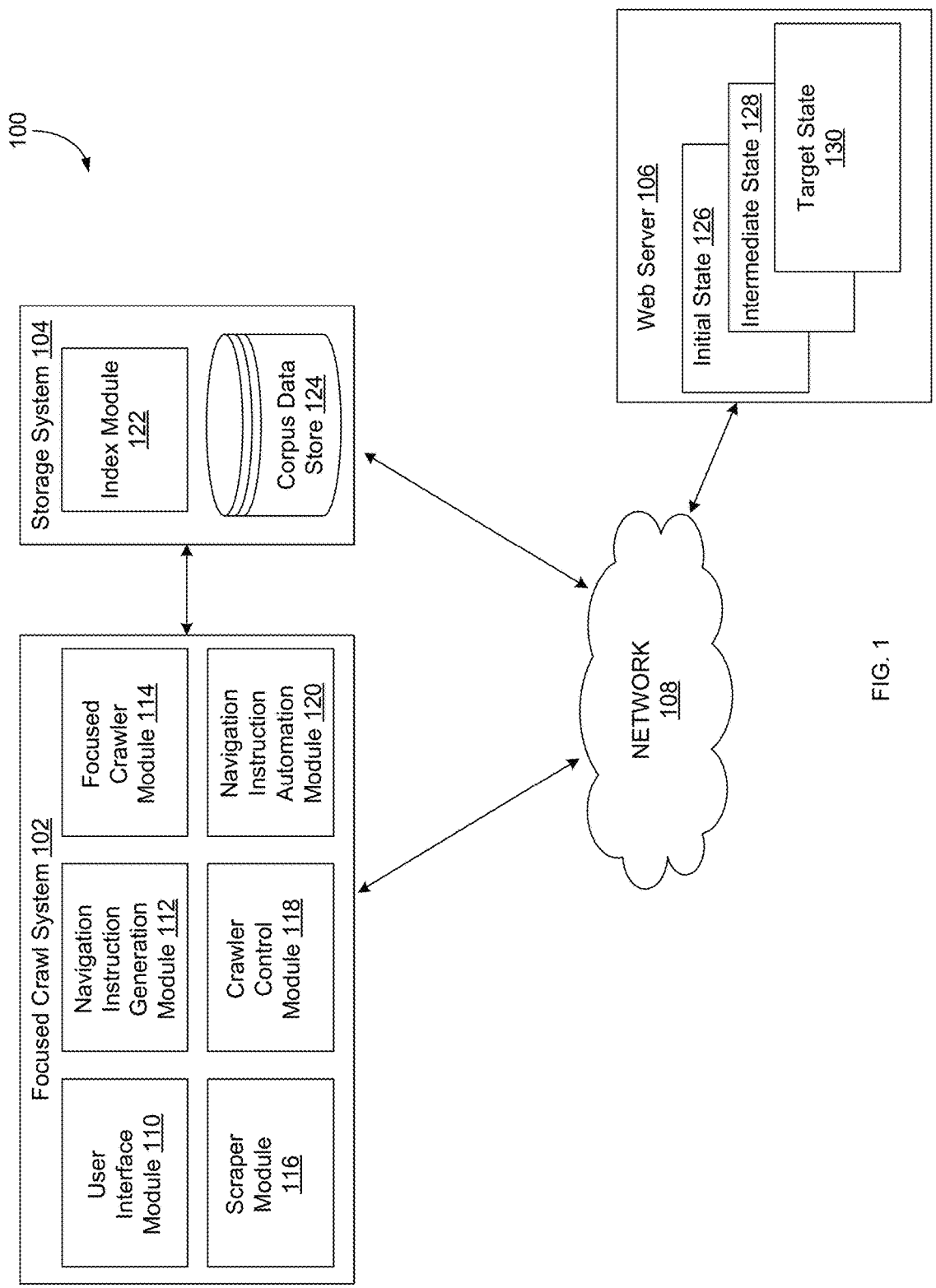
FIG. 1 is a block diagram of an exemplary environment in some embodiments.

In various embodiments, a focused network crawler may target specific information on a website, a network site, on any number of web pages, or any number of network files. Unlike general web crawlers which crawl through all links on a seed page, a focused network crawler, in some embodiments, may utilize navigation instructions to target specific information.

Navigation instructions are instructions for the focused network crawler. The navigation instructions may include states and transitions between states. In some embodiments, a state is a web page or other network file. A state may be or refer to content of a web page or other network file. In some embodiments, a state may be or refer to content of a web page or other network file at a point in time. A transition may be an action to be taken utilizing one or more interactive elements associated with one or more states. An interactive element may be any functional component of a web page or network file. For example, a transition utilizing an interactive element may include scrolling down a web page or network file (e.g., file on a network), mouseovers, clicking links, pressing buttons, sliding sliders, or the like. A transition may be, for example, any activity associated with one or more interactive elements (e.g., an element on a web page that may perform any functions based on a user's interaction with that element).

In various embodiments, the navigation instructions may include a path from one state to another. The path may be to or towards a target or destination state. The path may include the states and transitions between states from the initial (or seed state) to the target state. Navigation instructions may include any number of paths from an initial state to any number of target states. Further navigation instructions may include any number of paths from any number of initial states to any number of target states.

The focused web crawler may utilize navigation instructions beginning at a seed web page (e.g., a seed or initial state), and transition to a different web page (e.g., an intermediate state between a seed state and a target state) or seed state based on the navigation instructions. The focused web crawler may navigate to a target web page or target file based on the navigation instructions. A scraper or other software may copy all or a part of the information contained on the target web page and/or the target file. The copied information may be stored on a remote digital device (e.g., stored in a corpus in a data store). In some embodiments, the seed page and/or one or more different web pages identified in the navigation instructions may be on different web servers or different sites. For example, a seed web page may be on a first site (e.g., a subreddit) that includes a link to a different web page (e.g., an intermediate state or a target state) that is on a second site (e.g., on a different web server). Any number of the intermediate states, target state, and/or the seed state may be associated with any number of web pages on any number of web sites.

In various embodiments, as described herein, the focused crawler module may not access a network site or visit web pages as often as a general web crawler because the focused crawler module tends to navigate paths that regular users tend to navigate during web browsing. Further, the focused crawler module and/or the scraper are directed to take information from a target state and not every page of a site.

The navigation instructions provided to the focused crawler module and/or the scraper reduce the number of visits and may keep the focused crawl system from surpassing the rate limits, monthly limits, and total limits.

FIG. 1 is a block diagram of an exemplary environment 100 in some embodiments. Environment 100 comprises a focused crawl system 102, a storage system 104, and a web server 106 which may communicate over network 108. The focused crawl system 102 may comprise a user interface module 110, a navigation instruction generation module 112, a focused crawler module 114, a scraper module 116, a crawler control module 118, and a navigation instruction automation module 120. The storage system 104 may comprise an index module 122 and a corpus data store 124. The web server 106 may comprise an initial state 126, an intermediate state 128, and a target state 130. The term "exemplary" as utilized herein refers to serving as an example but not necessarily the best example.

In various embodiments, the focused crawl system 102 may be configured to navigate any number of web pages and/or network files utilizing navigation instructions. In various embodiments, the navigation instructions may identify states and define transitions between states. For example, the focused crawl system 102 may begin navigating at a file or page of a network (e.g., a seed URL on the Internet) identified by the navigation instructions. The navigation instructions may include instructions to the focused crawl system 102 to perform an action associated with an interactive element on the file or page of the network to navigate to another state (e.g., click on a link on the file or page of the network to navigate to another file or page). The navigation instructions may include instructions for the focused crawl system 102 to navigate any number of files and/or pages utilizing the transitions (e.g., actions associated with interactive elements) to reach a target file or page (i.e., a target state). A scraper (e.g., scraper module 116) or other software may copy or scrape any amount of information from the target file or page. The copied or scraped information may be stored in a data store such as the corpus data store 124.

There may be many different types of transitions. For example, the focused crawl system 102 and/or the scraper module 116 may pull inks from a page based on how the page is structured, rather than how the page uses interactive elements. This type of transition may be termed an Xpath transition. In a conditional transition, the focused crawl system 102 and/or the scraper module 116 checks if data exists on a page and transitions to a new page. In some embodiments, in a conditional transition, the focused crawl system 102 and/or the scraper module 116 may pull a subset of pages from a set of pages through a transition. For example, there is a state in Groupon called "groupon-deal" which represents pages that represent a single groupon deal. There may be a transition that checks if the expiration date has not yet been reached and transitions to the new state "not-expired-groupon-deal." Note that this may not change pages or execute any interactions, rather, the process may change the state without changing the page. In some embodiments, the focused crawl system 102 performs a plugin transition, whereby the focused crawl system 102 executes arbitrary code to transition to a new state. The focused crawl system 102 may perform a plugin transition by recording analytics when transitioning, performing url parsing, or even performing machine learning tactics while the crawl is running.

In various embodiments, the focused crawl system 102 may perform a form transition, whereby the focused crawl system 102 may fill forms to move to a new state. One example is the UCSD class catalog which has a form that needs to be filled out to get the class information. Another example is the focused crawl system 102 filling out a login form and agreeing to user end license agreements which are generally done as html forms.

Figure 10:
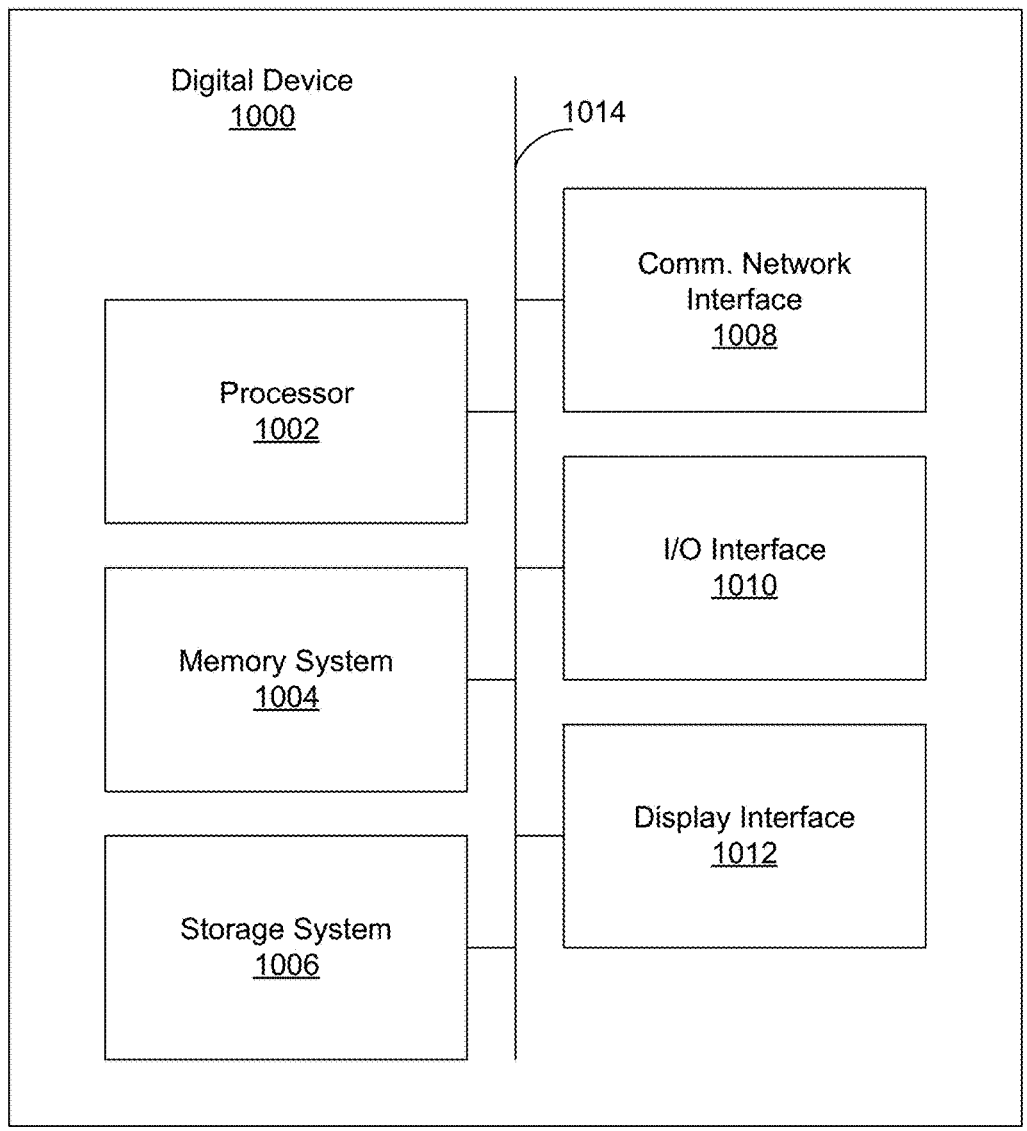
FIG. 10 is a block diagram of an exemplary digital device.

The focused crawl system 102 (e.g., the focused crawler module 114 of the focused crawl system 102) may navigate any files or pages on any number of networks. In one example, the focused crawl system 102 navigates web pages hosted by one or more web servers. In another example, the focused crawl system 102 navigates files on one or more digital devices (e.g., one or more servers and/or remote digital devices) on one or more networks. Files may include pages, documents, executables, images, audio files, movies, text files, presentations, spreadsheets, objects, and/or the like. A digital device is any device with a memory and a processor. An example of a digital device is depicted in FIG. 10.

The focused crawl system 102 may navigate any files or pages across any types of networks. For example, the focused crawl system 102 may navigate from one or more pages and/or files of an Internet web server to one or more pages and/or files of a remote digital device (e.g., a file server or email server) in communication with a non-public network.

The user interface module 110 may be configured to assist in the creation of navigation instructions. In various embodiments, a user utilizes the user interface module 110 to assist the navigation instruction generation module 112 to create the navigation instructions. For example, the user may utilize the user interface module 110 to identify a seed page (e.g., an initial state 126) from which to begin navigation by the crawler (e.g., the focused crawler module 114). The user may then identify an interactive element associated with the seed page and define a transition to instruct the focused crawler module 114 to navigate to another page (e.g., an intermediate state 128 and/or a target state 130). In one example, the user may identify any number of actions associated with any number of interactive elements to navigate to the intermediate state 128.

Each intermediate state 128 may be linked to any number of other intermediate states 128 or a target state 130 via interactive elements. The user may define transitions (e.g., any number of actions associated with interactive elements of each of the intermediate states) to navigate the focused crawler module 114 from one state to another (e.g., from one intermediate state 128 to another intermediate state 128 or target state 130). The target state 130 is the destination of the navigation of the focused crawler module 114. The target state 130 may be identified and/or defined by the navigation instructions (e.g., identified or defined by a user using the user interface module 110). The target state 130 is any page or file with desired information.

Figure 3:
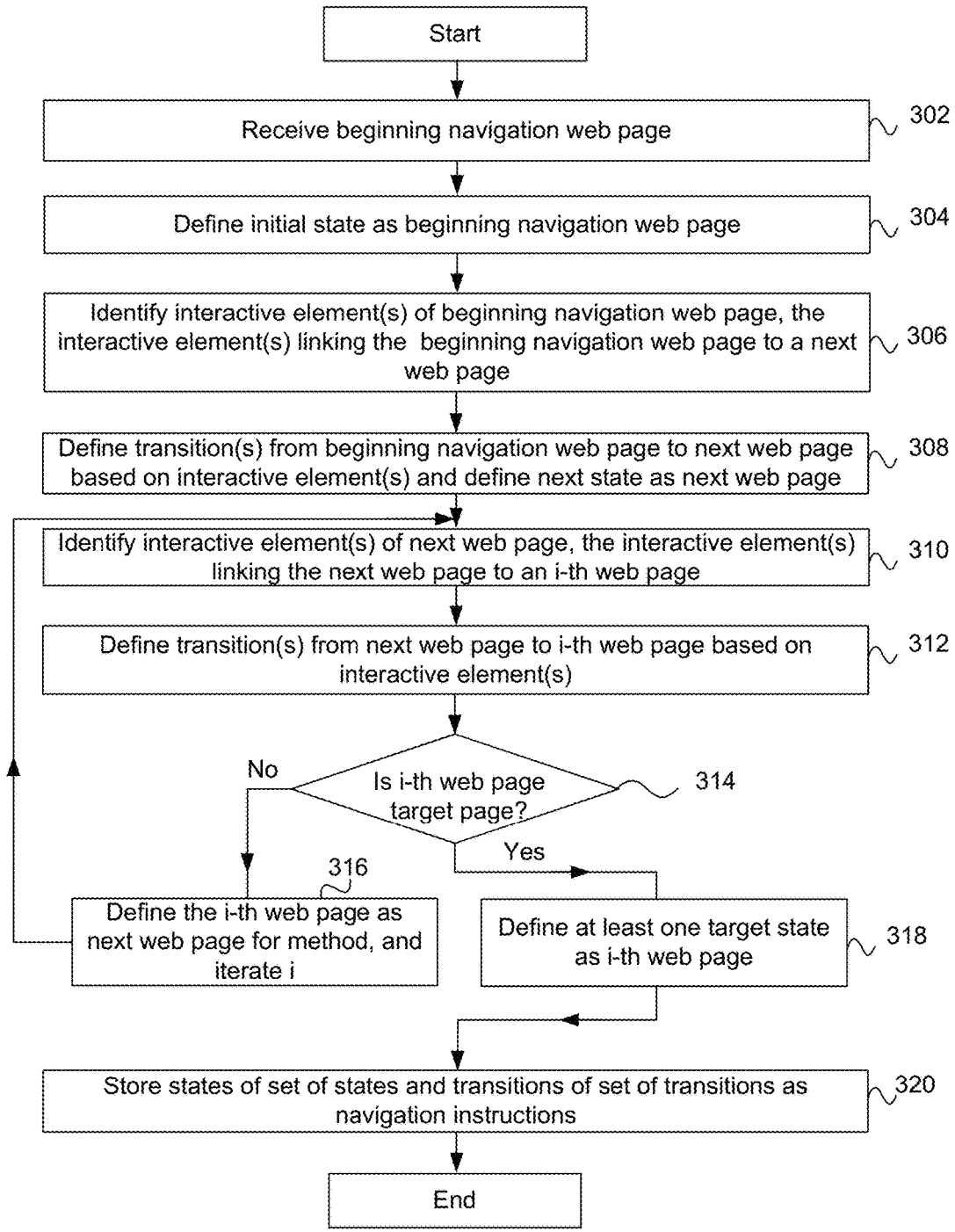
FIG. 3 is a flowchart of creating navigation instructions in some embodiments.
Figure 8:
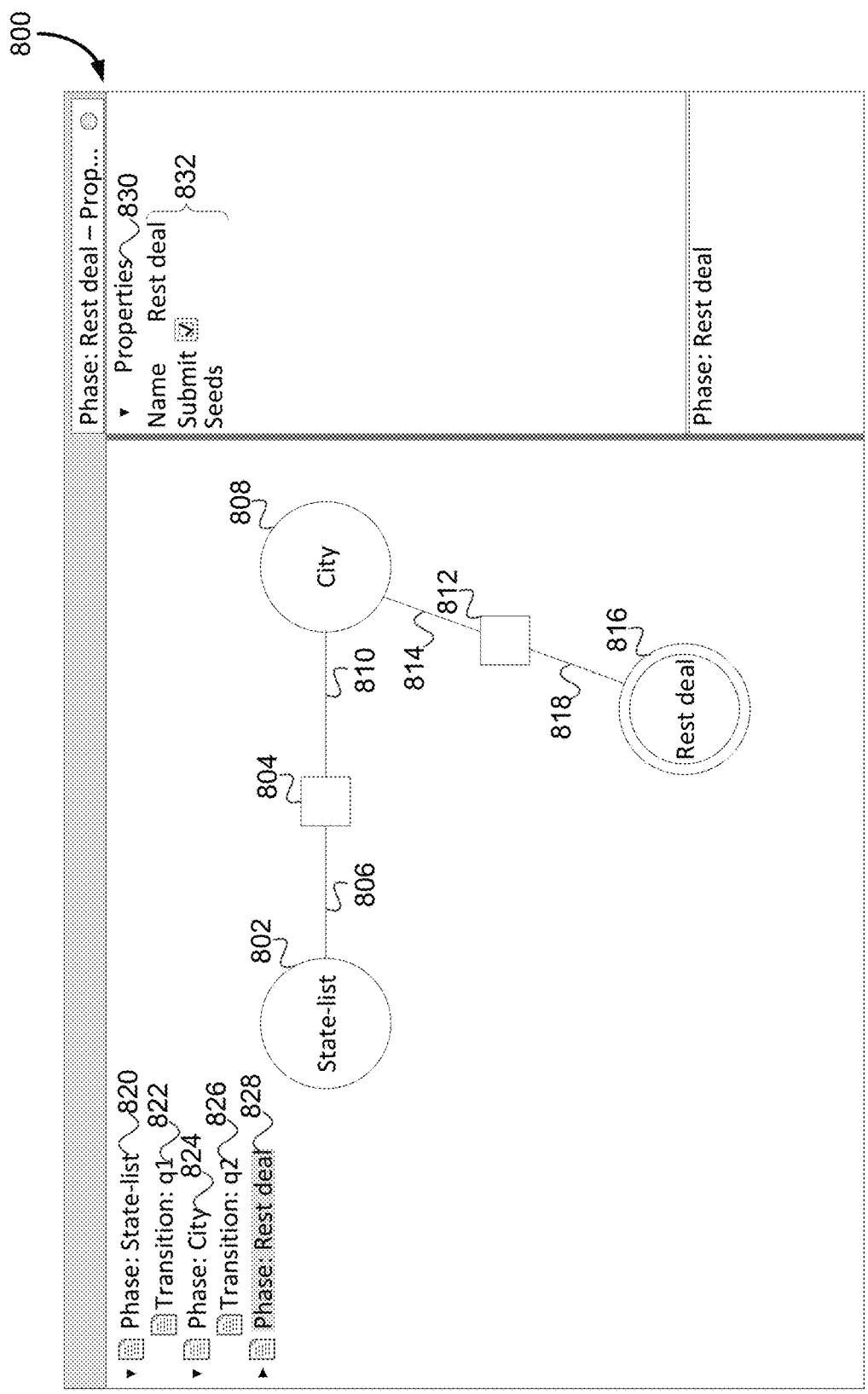
FIG. 8 is a graphical user interface for generating navigation instructions in some embodiments.
Figure 9:
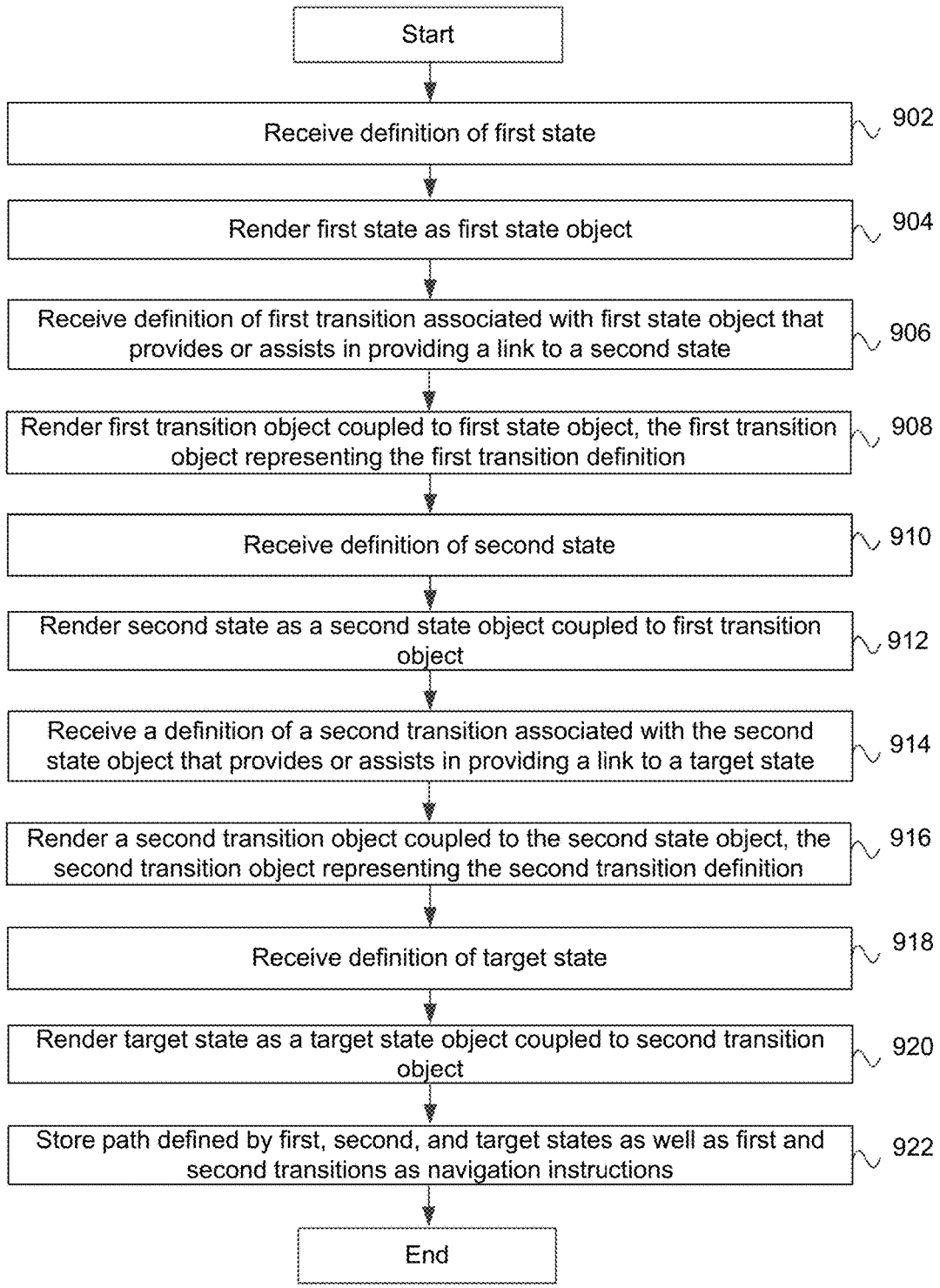
FIG. 9 is a flowchart for rendering objects of a graph for generating navigation instructions in some embodiments.

An exemplary process utilizing the user interface module 110 is discussed regarding at least FIGS. 3, 8, and 9.

Once the focused crawler module 114 navigates to a target state 130, a scraper (e.g., scraper module 116) or other module may copy or scrape all or some of the information on the target state 130. In some embodiments, the navigation instructions instruct the scraper module 116 or other module to copy or scrape information. Further, the navigation instructions may identify the information to be scraped or copied. For example, the navigation instructions may identify a subset of information of a target state 130 (e.g., some but not all information available at the target state 130) to be scraped or copied by the scraper module 116. In various embodiments, the navigation instructions do not identify information to be scraped or copied. Further, the navigation instructions may not, in some embodiments, include instructions for the scraper module 116 or other modules to copy or scrape information.

There may be any number of interactive elements providing links to any number of intermediate states 128 (e.g., there may be any number of web pages linked to a seed page). One or more users may define any number of transitions to navigate the focused crawler module 114 from the seed page (e.g., the initial state 126) to any, some, or all of the linked pages (e.g., the intermediate states 128). In one example, xpath may be utilized to generate instructions for the focused crawler module 114 to navigate from the seed page or an intermediate state 128 to any number of other intermediate states 128 and/or target states 130.

The user interface module 110 may generate a graphical user interface (a "GUI") or a non-graphical user interface. A depiction of an exemplary interface generated by the user interface module 110 is in FIG. 8.

The navigation instruction generation module 112 may generate the navigation instructions that instruct the focused crawler module 114 to navigate any number of pages or files to a target (e.g., navigate from any number of initial and intermediate states to any number of target states). The navigation instruction generation module 112 may generate the navigation instructions based on input from the user interface module 110 and/or input from the navigation instruction automation module 120. The navigation instruction generation module 112 may store any or all navigation instructions (e.g., in a local and/or remote data store).

The navigation instruction generation module 112 may generate any number of navigation instructions. The navigation instructions 112 may generate instructions based on input from any number of user interface modules 110, any number of digital devices, and/or any number of navigation instruction automation modules 120.

In some embodiments, the process of creating navigation instructions may be automated (e.g., utilizing machine learning, artificial intelligence, and/or pattern recognition). In one example, the navigation instruction generation module 112 may generate the navigation instructions based on input from the navigation instruction automation module 120 which is further described herein.

In various embodiments, the navigation instruction generation module 112 allows for modifications and/or other changes to navigation instructions. In various embodiments, a user utilizing the user interface module 110 may request previously stored navigation instructions. The navigation instruction generation module 112 may retrieve the previously stored navigation instructions and provide the navigation instructions to the user interface module 110. The user interface module 110 may allow the user to make deletions, additions, or any changes (e.g., adding, removing, or modifying states and/or transitions of the navigation instructions).

In some embodiments, the navigation instruction automation module 120 may request previously stored navigation instructions. The navigation instruction generation module 112 may retrieve the previously stored navigation instructions and provide the navigation instructions to the navigation instruction automation module 120. The navigation instruction automation module 120 may then make deletions, additions, or any changes (e.g., adding, removing, or modifying states and/or transitions of the navigation instructions). The updated navigation instructions may then be stored.

The focused crawler module 114 may be a crawler or navigator instructed to navigate any number of pages and/or files to any number target pages and/or files based on the navigation instructions. In some embodiments, the focused crawler module 114 retrieves navigation instructions and navigates the pages and/or files based on the instructions. In various embodiments, the focused crawler module 114 may be or work in conjunction with one or more bots. A software bot (e.g., an Internet bot) is a software application that may run automated tasks over a network such as the Internet. Typically, a bot performs tasks that are simple and repetitive.

The scraper module 116 may scrape, copy, or extract information from one or more web pages and/or network files. In various embodiments, instructions for the scraper module 116 (e.g., what to copy, when to copy, and/or where to copy) may be included in the navigation instructions. In some embodiments, the navigation instructions do not include instructions for the scraper module 116.

In various embodiments, the scraper module 116 may copy desired information from a target state 130 (e.g., a target web page) and store the information in the corpus data store 124. The scraper module 116 may be optional.

For example, once the focused crawler module 114 navigates to a target state 130 any number of processes or functions may occur. In some embodiments, the focused crawler module 114 publishes (e.g., makes available) results of the navigation and/or the target state 130. In various embodiments, a discovery module (not pictured in FIG. 1) may discover links associated with (e.g., links on) the target state 130. Alternately or additionally, a counting module (not pictured in FIG. 1) may count the number of pages that are published.

Due to network resource usage as previously described regarding general crawlers, some networks and/or website operators attempt to limit or stop scraping or copying of significant information from their websites by blacklisting based on limits to the number of times the network or website is accessed (e.g., limits over a short predetermined period of time, limits over a longer period of time, and/or total limits).

As discussed herein, a web server that utilizes rate limiting limits the number of times a site or set of web pages is visited by a particular IP address or particular machine (e.g., MAC address) over a short period of time (e.g., over a second or minute). A web server that utilizes monthly limits utilizes a process that is similar to rate limiting but over a longer period of time (e.g., over a month). A web server that utilizes total limits utilizes a process that limits the total visits over any period of time.

In various embodiments, as described herein, the focused crawler module 114 may not access a network site or visit web pages as often as a general web crawler because the focused crawler module 114 tends to navigate paths that regular consumers tend to navigate during web browsing. Further, the focused crawler module 114 and/or the scraper module 116 are directed to navigate to and/or copy information from a target state 130 and not every page of a site. The navigation instructions provided to the focused crawler module 114 and/or the scraper module 116 may reduce the number of visits and may keep the focused crawl system 102 from surpassing the rate limits, monthly limits, and total limits.

Even though the visits of the focused crawl system 102 may naturally be below many rate limits, monthly limits, and total limits, the focused crawl system 102 may comprise an optional crawler control module 118 to control the focused crawler module 114 to provide additional confidence that the focused crawl system 102 is not blacklisted by surpassing the limits of one or more network sites or web sites. In various embodiments, the crawler control module 118 coordinates any number of focused crawler modules 114 associated with any number of IP addresses, proxies, or the like. In some embodiments, the crawler control module 118 coordinates any number of focused crawler modules 114 on any number of virtual and real digital devices. In some embodiments, the crawler control module 118 may use virtual and real digital devices at random to access, visit or navigate states along a path to further prevent detection.

In various embodiments, techniques used herein may allow for the identification and collection of useful information with limited impact of a host web site's resources thereby respecting safeguards such as rate limit threshold, a monthly limit threshold, and a total limit threshold. In some embodiments, the crawler control module 118 may also be configured to coordinate use of IP addresses, DNS servers, proxies, virtual machines, and hardware to maintain visits below a rate limit threshold, a monthly limit threshold, and a total limit threshold. Paths identified in the navigation instructions need not be navigated serially but may be navigated by any number of virtual or hardware machines utilizing different IP addresses, DNS servers, and/or proxies. The navigation may be serially, in parallel, or a combination of both.

Similarly, the crawler control module 118 may control the scraper module 116. In various embodiments, the crawler control module 118 coordinates any number of scraper modules 116 associated with any number of IP addresses, proxies, or the like. In some embodiments, the crawler control module 118 coordinates any number of scraper modules 116 on any number of virtual and real digital devices.

In various embodiments, the process of creating the navigation instructions is automated. For example, machine learning and/or artificial intelligence may utilize the user interface module 110 and/or the navigation instruction generation module 112 to create the navigation instructions.

In various embodiments, the navigation instruction automation module 120 may utilize pattern recognition to identify or define states, interactive elements, and/or transitions. For example, the navigation instruction generation module 112 may access a web page and review one or more links on the web page (e.g., either by examining addresses in the web page code associated with one or more links, examining information on the web page associated with one or more links, and/or navigating to a subset of other pages utilizing a subset of links on the web page). If the web page appears to provide access to desirable information on other pages, the web page may be identified as a potential initial state 126 or a potential intermediate state 128. If the web page appears to include desirable information (e.g., reviews, movie information, deal information, rental information, or the like), the web page may be identified as a potential target state 130. The navigation instruction automation module 120 may sample, analyze, and extrapolate information to identify potential states, identify interactive elements, and define groups of transitions.

In one example, the navigation instruction automation module 120 may scan a subset of web page links and determine that the links appear to be directed to movie information (e.g., the link code or link titles appear to be directed to different movies). The navigation instruction automation module 120 may, in some embodiments, compare information from link encoding or link titles to known information (e.g., a corpus of movie titles from other web sites) to confirm or enable identification of the information. The navigation instruction automation module 120 may identify the web page as a potential state and describe the web page as being related to a type of information (e.g., movie information). In some embodiments, the navigation instruction automation module 120 may define a group of transitions assuming that similar links lead to similar types of information (e.g., different movie reviews). A user may confirm the potential states and/or definitions. In some embodiments, the focused crawl system 102 may attempt to navigate all or a subset of paths and/or attempt to copy some or a subset of desired information based on the potential states and/or transitions to test the path and determine if the navigation and/or copying is successful.

In various embodiments, the navigation instruction automation module 120 may utilize other similar sites and/or types of desired information as guidance (e.g., utilizing machine learning, artificial intelligence, or pattern recognition) to identify potential states and/or potentially define transitions. For example, many restaurant or product reviews may be organized in a similar manner. As such, a sampling of web pages and interactive elements of the web page may allow the navigation instruction automation module 120 to identify a type of web page and the type of information associated with interactive elements. Similarly, based on the recognition of a web page being similar to other web pages associated with the same type of information, the navigation instruction automation module 120 may identify all or some interactive elements as leading to initial states 126, intermediate states 128, or target states 130 thereby allowing for creating potential states and/or defining potential transitions for any number of paths.

In various embodiments, the navigation instruction automation module 120 may utilize pattern recognition and machine learning techniques. For example, one or more user interactions with a network site may be monitored (e.g., users who explore the site). The navigation instruction automation module 120 may utilize machine learning techniques based on the monitored user interactions to identify potential states and/or potentially define transitions.

The information copied from the target state(s) 130 may be curated. In some embodiments, administrators and the like may sample saved information to confirm accuracy and relevance. Users may retrieve stored information and may provide notification if information from the focused crawl system 102 is not relevant (e.g., the information is not from a target state 130 due to changes such as structure changes in the web pages over time or an error in the navigation path). Analytics may further indicate when users do not have the saved information to be helpful. As a result of the indications, the focused crawl system 102 may notify administrators to correct navigation instructions (e.g., via the user interface module 110) or to automate updates to the navigation instructions using the navigation instruction automation module 120.

The storage system 104 may be any digital device that includes the index module 122 and the corpus data store 124. The storage system 104 may be a part of the focused crawl system 102 or may be another device. The storage system 104 may receive information from any number of focused crawl systems 102 (e.g., copied from any number of target states 130). The storage system 104 may be local or remote to the focused crawl system 102.

The index module 122 may index all or some of the information stored in the corpus data store 124 to allow for easy search, identification, and/or retrieval. The index module 122 may organize and/or index information associated with the corpus data store in any number of ways. The corpus data store 124 is any data structure (e.g., database) that may store information from the target states 130.

In various embodiments, the storage system 104 is configured to store information from target states 130 from any number of focused crawl systems 102 and provide any or all stored information to qualified requesters.

The web server 106 is any digital device that includes the initial state 126 and the target state 130. The web server 106 may optionally include the intermediate state 128. Although the web server 106 is identified as a server for the web (e.g., the Internet), the web server 106 may be or include any digital device accessible by the network 108 and that includes or provides access to the initial state 126, the intermediate state 128, and/or the target state 130.

The network 108 may include a computer network or combination of user networks (e.g., a combination of wireless and wired networks). The network 108 may include technologies such as Ethernet, 802.11x, worldwide interoperability for microwave access WiMAX, 2G, 3G, 4G, CDMA, GSM, LTE, digital subscriber line (DSL), and/or the like. The network 108 may further include networking protocols such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or the like. The data exchanged over the network 108 can be represented using technologies and/or formats including hypertext markup language (HTML) and extensible markup language (XML).

A module may be hardware, software, or a combination of both. In some embodiments, a module may instruct a processor to perform methods, steps, and/or functions. In various embodiments, a processor may execute a module to perform methods, steps, and/or functions. Although the focused crawl system 102 and storage system 104 includes identified modules, there may be less or more modules associated with any device that perform any number of functions. Further, some modules of the digital devices identified herein are optional.

Figure 2:
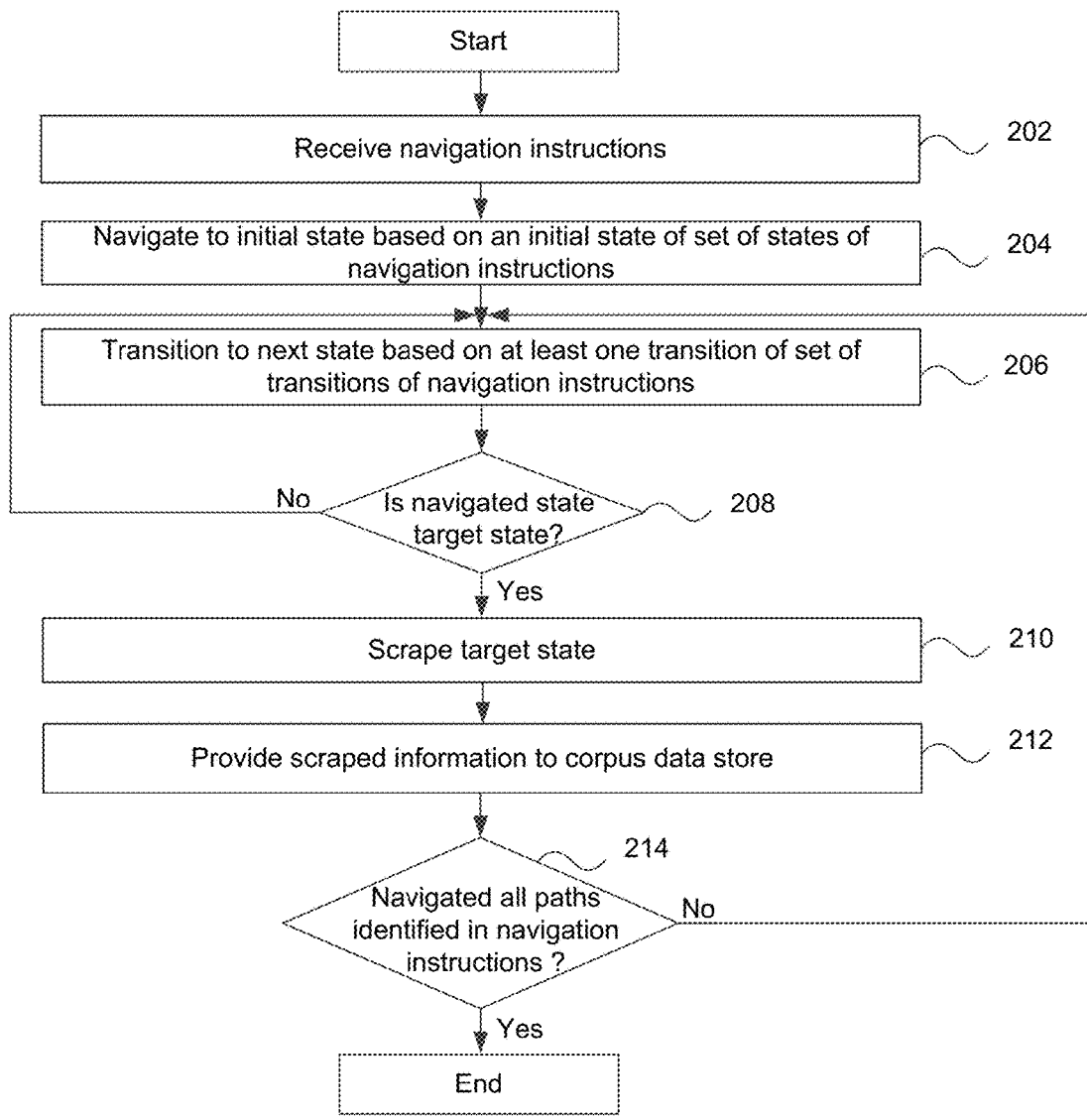
FIG. 2 is a flowchart of a focused crawl utilizing navigation instructions in some embodiments.

FIG. 2 is a flowchart of a focused crawl utilizing navigation instructions in some embodiments. In step 202, the focused crawler module 114 receives navigation instructions. In some embodiments, the focused crawler module 114 receives navigation instructions from the navigation instruction generation module 112. In various embodiments, the focused crawler module 114 may be scheduled to retrieve any number of navigation instructions at predetermined times, after predetermined durations, and/or upon a detected occurrence (e.g., a change in a previously defined path of the navigation instructions or a change of desired information in a target page). Scheduled times may be different for different navigation instructions. For example, a highly dynamic web site may require navigation more often than a site which rarely changes.

In step 204, the focused crawler module 114 navigates to an initial state 126 (e.g., a seed page or file) based on an initial state of a set of states of the navigation instructions. In various embodiments, the user or navigation instruction automation module 120 provides an initial state 126 (e.g., a seed page URL or path to a file) as a part of the navigation instructions.

In step 206, the focused crawler module 114 transitions to a next state (e.g., intermediate state 128 or target state 130) from the initial state 126 based on at least one transition of a set of transitions of the navigation instructions. A set may include one or more members. In various embodiments, the focused crawler module 114 may receive instructions to perform one or more actions associated with one or more interactive elements of the initial state 126. For example, the focused crawler module 114 may receive instructions to click a link on the initial page to access a next page. In another example, the focused crawler module 114 may receive instructions to scroll down a page and perform a mouseover over an interactive element to access additional information and/or functionality. The focused crawler module 114 may perform any number of actions associated with the initial state 126 to navigate to the next state.

In step 208, the focused crawler module 114 may determine if the state that the focused crawler module 114 has navigated to (e.g., utilizing the transition instructions from the navigation instructions) is the target state 130. If the focused crawler module 114 has not yet navigated to a target state 130, the method continues to transition to the next state repeating step 206. For example, the focused crawler module 114 may transition to the next page based on at least one transition of a set of transitions of the navigation instructions. Each initial state 126 or intermediate state 128 that the focused crawler module 114 navigates to may be associated with one or more different or similar transitions of the navigation instructions to assist the focused crawler module 114 to navigate to the target state 130. The process will continue until the focused crawler module 114 navigates to a target state 130.

In step 210, the scraper module 116 scrapes and/or copies information from the target state 130. In some embodiments, the scraper module 116 receives instructions to scrape or copy all or some information from the target state 130. In some embodiments, the instructions to scrape or copy indicate what information associated with the target state 130 to scrape or copy. The instructions may be a part or not a part of the navigation instructions.

In step 212, scraped or copied information is stored in the corpus data store 124. In various embodiments, the all or some of the scraped or copied information is indexed by the index module 122.

In optional step 214, the focused crawl system 102 may determine if the crawler has navigated all paths identified in the navigation instructions. For example, there may be multiple paths from an initial state 126 to multiple target states 130. If not all paths have been navigated, the method may return to a previous state (e.g., a previous initial state 126 or intermediate state 128) and utilize a different transition to or towards another target state.

In various embodiments, the focused crawler module 114 determines if a state has been successfully reached and/or if a transition to a next state is successful. For example, the focused crawler module 114 may confirm that a specific state has been reached. The focused crawler module 114 may confirm each state during navigation or may confirm a subset of states. In some embodiments, the focused crawler module 114 (or the scraper module 116) may confirm a target state 130 and/or information contained within the target state 130.

If navigation to a state (e.g., an intermediate state 128 and/or a target state 130) is not successful, the focused crawler module 114 may provide a notification to a user and/or any number of digital devices to indicate that one or more paths may no longer be accurate. In various embodiments, a user utilizing the user interface module 110 and/or a browser to retrace any number of path(s) to identify changes and make corrections. The user may redefine states and/or transitions to correct the path to the target state(s) 130.

In various embodiments, the navigation instruction automation module 120 may confirm the navigation to each state along a path and/or transitions to next states. The navigation instruction automation module 120 may provide a notification to a user and/or any numbers of digital devices to indicate which state(s) and/or transition(s) are not successful. In various embodiments, the navigation instruction automation module 120 may identify the last successful state as well as interactive elements of that last successful state to in order to navigate from the last successful state to other pages and/or files. The navigation instruction automation module 120 may identify the other page and/or files and navigate to other linked pages and/or files to determine if the navigation instruction automation module 120 may reach the previously expected state and/or desired target state.

If the navigation instruction automation module 120 confirms that a desired target state is found and/or a previously expected state was found, the navigation instruction automation module 120 may store the updated navigation instructions. If the navigation instruction automation module 120 does not confirm that the desired target state is found and/or a previously expected state was found, the navigation instruction automation module 120 may provide a notification to a user and/or any number of digital devices.

Unlike general web crawlers, the focused crawl systems 102 may navigate in a manner that is similar to users and consumers (e.g., normal traffic) without accessing every link on a page and/or scraping sites. In some embodiments, the focused crawl systems 102 may not view a page or network site's encoding, but rather may assess viewable information thereby avoiding honeypots designed to identify automated systems that consume large amounts of resources (e.g., general web crawlers) without respect to the network site. In various embodiments, the focused crawl system 102 determines which links may lead to desired information (e.g., links to intermediate states 128 and/or target states 130) through sampling, pattern recognition, or user involvement.

In some embodiments, the navigation of one or more focused crawl systems may be recognized through pattern recognition. A network or web site may detect a change in normal navigation (e.g., an increase in the number of visits) to any number of network files or web pages. Since the focused crawl system 102 may mirror normal consumer or user navigation, however, the network or web site may not be able to detect one or more focused crawl system 102 itself, rather the network or web site may detect that they are being utilized in this manner.

A network or web site that blacklists IP addresses, MAC addresses or other identifiers based on pattern recognition runs the risk of blacklisting users and consumers.

FIG. 3 is a flowchart of creating navigation instructions in some embodiments. In various embodiments, the user interface module 110 and/or the navigation instruction automation module 120 may receive a beginning navigation web page (e.g., an initial state 126) in step 302. The beginning navigation web page may be a seed page. In one example, the user interface module 110 and/or the navigation instruction automation module 120 receive a URL. In some embodiments, the user interface module 110 and/or the navigation instruction automation module 120 receives an address or path to any remote web page or file on a digital device.

The method described regarding FIG. 3 is directed to a web page and the Internet. A web page and the Internet are not required. Systems and methods described herein may be utilized to navigate public and/or private networks, including any web page(s) and/or file(s).

In step 304, the user interface module 110 and/or the navigation instruction automation module 120 may define an initial state 126 (e.g., a seed page) as the beginning navigation web page. In one example, one or more users may enter a URL, address, and/or path to a web page or file in the user interface module 110 as the beginning navigation web page. In another example, the navigation instruction automation module 120 may select an initial state 126 from a plurality of initial states (e.g., a plurality of seed pages provided by one or more users and/or digital devices).

In step 306, the user interface module 110 and/or the navigation instruction automation module 120 may identify interactive element(s) of or within the beginning navigation web page. The identified interactive elements may link the beginning navigation web page to a next web page (e.g., link the initial state 126 to an intermediate state 128 or target state 130). Each interactive element may be any interactive component or combination of interactive components (e.g., a combination of links, sliders, mouseovers, vertical scrolls, horizontal scrolls, and/or the like).

In some embodiments, the user interface module 110 and/or the navigation instruction automation module 120 scans the initial state 126 for interactive elements. The user interface module 110 and/or the navigation instruction automation module 120 may identify interactive elements such as links or other information associated with other web pages that are linked to the initial state 126 via one or more interactive elements.

In step 308, the user interface module 110 and/or the navigation instruction automation module 120 defines transition(s) from the beginning navigation web page (e.g., the initial state 126) to the next web page (e.g., the intermediate state 128 or the target state 130) based on the interactive elements(s). As discussed herein the transition(s) may include any number of actions utilizing any number of interactive elements to navigate to a subsequent web page.

In one example, a user may view a web page to identify interactive elements and define actions to be taken to access a subsequent web page to navigate to the target page (e.g., the user may view the web page, identify links, and define a transition as a click on a link). The user may also identify the next page based on encoding of the current page, titles, labels, or any other information. In some embodiments, the user may identify the next page by navigating to the next page.

Similarly, in another example, the navigation instruction automation module 120 may scan interactive elements on a web page, compare the interactive elements to known interactive elements to define actions to be taken to access a subsequent web page to navigate to the target page 130. The navigation instruction automation module 120 may also identify the next page based on encoding of the current page, titles, labels, or any other information. In some embodiments, the navigation instruction automation module 120 may identify the next page by navigating to the next page.

In step 310, the user interface module 110 and/or the navigation instruction automation module 120 identifies interactive element(s) of the next page. The interactive element(s) may link the next page to another web page (i.e., to an i-th web page wherein i is an integer greater to or equal to zero) such as an intermediate state 128 or target state 130. The interactive element may be any interactive component or combination of interactive components. This process may repeat or be otherwise similar to the process described with respect to step 306.

In step 312, the user interface module 110 and/or the navigation instruction automation module 120 defines transition(s) from the next web page (e.g., the intermediate state 128) to another web page (e.g., the i-the web page which may be another intermediate state 128 or the target state 130) based on the interactive elements(s). As discussed herein the transition(s) may include any number of actions utilizing any number of interactive elements to navigate to a subsequent web page.

In step 314, the user interface module 110 and/or the navigation instruction automation module 120 determines if the i-th web page is the target web page. For example, the user interface module 110 and/or the navigation instruction automation module 120 determine if the i-th web page is an intermediate state 128 or a target state 130. The user interface module 110 and/or the navigation instruction automation module 120 may navigate to the i-th web page and/or retrieve information (coding, text, labels, or the like) associated with a page linked to the i-th web page for the determination.

If the i-th web page is not the target page, the user interface module 110 and/or the navigation instruction automation module 120 defines the i-th web page as the next web page (for the purposes of returning to steps 310 and 312) and iterates i (e.g., the value of i may be i+1). The method may continue by scanning the i-th web page (now termed the "next web page") for interactive elements in step 310.

If the i-th web page is the target page, the user interface module 110 and/or the navigation instruction automation module 120 may define at least one target state 130 as the i-th web page. In some embodiments, the user interface module 110 and/or the navigation instruction automation module 120 may identify all or some information to be copied or scraped from the target page. For example, a user may navigate to the target page and utilize the user interface module 110 to identify the desired information. The navigation instruction automation module 120 may scan the target page for the desired information.

In various embodiments, the user interface module 110 and/or the navigation instruction automation module 120 may identify any number of interactive elements and actions (e.g., another transition) that allows the desired information to be scraped or copied. For example, desired information may be accessed by clicking on a link, operating a slider, a mouseover, scrolling (e.g., up, down, left, and/or right), or the like.

In step 320, the user interface module 110 and/or the navigation instruction automation module 120 may store the states (e.g., the states of a set of states) and transitions (e.g., the transitions of a set of transitions) as navigation instructions. The states and transitions from the beginning navigation web page to the target page may define a path.

In some embodiments, the user interface module 110 and/or the navigation instruction automation module 120 determines if all target pages have been reached from one or more beginning navigation pages. For example, a seed page may be the initial landing page that may be utilized to access any number of target pages. The user interface module 110 and/or the navigation instruction automation module 120 may identify the target pages and track the created navigation instructions to ensure that each target page has been reached. If not all target pages have been accessed, the user interface module 110 and/or the navigation instruction automation module 120 may begin at any state and continue the process of identifying interactive elements and defining transitions to navigate to another target page.

Although the method in FIG. 3 is linear, any number of digital devices may be operating simultaneously or near simultaneously to identify the same or different interactive element(s), define the same or different transition(s), determine if states are target state, and/or search the next page.

Figure 4:
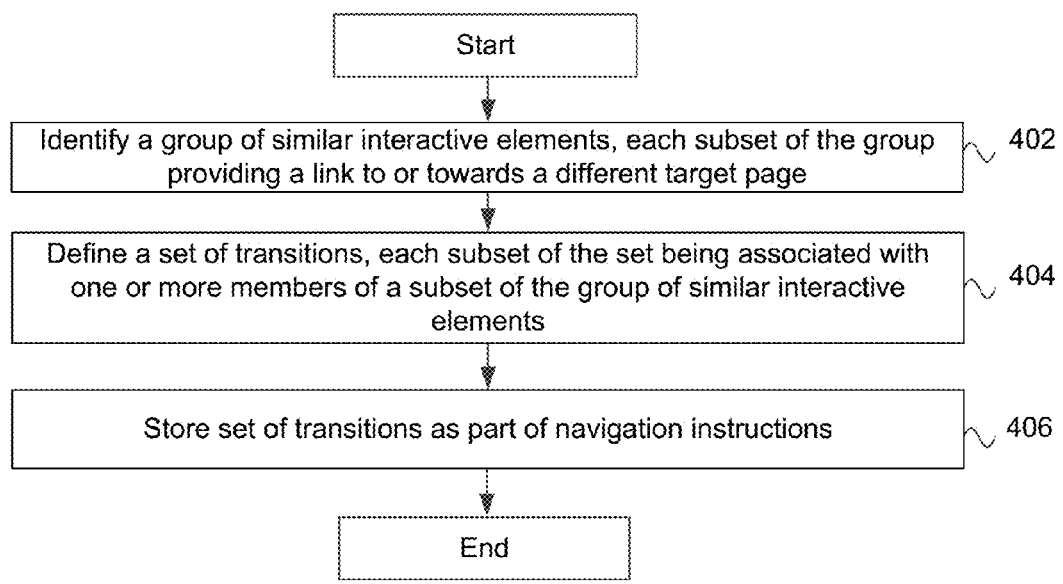
FIG. 4 is a flowchart for defining a group of transitions for navigation instructions in some embodiments.

FIG. 4 is a flowchart for defining a group of transitions for navigation instructions in some embodiments. Some pages comprise many interactive elements (e.g., links) to any number of desired target pages. For example, a movie review site may include a page linked to many different movie reviews. Each movie review may include desirable information to be copied or scraped.

In various embodiments, similar transitions may be similarly defined either serially or in parallel to reach next states (e.g., intermediate states 128 or target states 130). If the next states are target states 130 with information that is maintained in a similar fashion across the target states 130 (e.g., all movie reviews tending to be in the same position on a web page), instructions for scraping or copying may be similar for the target pages.

If the next states are intermediate states 128, each of the intermediate states 128 may contain any number of similar interactive elements thereby again allowing similar transitions to be similarly defined either serially or in parallel to reach next states (e.g., utilizing xpath).

The ability to generally identify expected states and define similar transitions as a group simplifies generation of the navigation instructions and lends to a graphical user approach to navigation instructions. Further, during debugging or correcting for changes over time, when one transition changes, other transitions may be similarly affected. As a result, in order to make changes to the navigation instructions, a user or digital device may begin with one state and step through one transition of many to identify one or more changes (e.g., an additional page was added to the path by the host of a web server) that may have rendered the path to the target page obsolete. Once one or more changes are made to identified states, identified interactive element(s), and/or definitions of transitions to find one target state, similar changes may be conducted on other states or transitions which may allow an efficient system for navigation instruction correction.

In step 402, the user interface module 110 and/or the navigation instruction automation module 120 identifies a group of similar interactive elements. Each subset (e.g., one or more interactive elements) of the group may provide a link to or towards a different target page.

In step 404, the user interface module 110 and/or the navigation instruction automation module 120 may define a set of transitions, each subset of the set being associated with one or more members of a subset of the group of similar interactive elements. In one example, xpath or a similar language may be utilized to define any number of transitions simultaneously, near simultaneously, and/or in parallel.

In step 406, the user interface module 110 and/or the navigation instruction automation module 120 may store the set of transitions as a part of the navigation instructions.

FIG. 5 is a depiction 500 of a seed state (e.g., an initial state 126 or beginning navigation web page) in some embodiments. The seed state 500 may be a restaurant review website organized, at least in part, by cities. Instead of scraping and/or copying all information and links of every page or a collection of pages, the focused crawler module 114 may be configured to navigate to the desired target page.

Subject title 502 identifies the types of links on the seed state 500. Links 506 are links (e.g., interactive elements) towards restaurant reviews for restaurants in different US Cities. For example, link 504 is a link to a page linked to restaurant reviews for restaurants in Albuquerque, N. Mex. In various embodiments, the seed state 500 may include different subject titles associated with different interactive elements (e.g., European Cities followed by links to pages of reviews of restaurants in those cities).

In some embodiments, interactive elements may be utilized to access any or all links 504. For example, the seed state 500 may require scrolling, mouseovers, or the like to access one or more of the links 504.

In some embodiments, the initial state 126 may be identified as the page 500. A transition may be defined as a clicking action on one of the links (e.g., link 504). Multiple transitions may be defined as a group (e.g., utilizing xpath or another language) thereby defining a group of transitions (e.g., each transition being a click action of a different link of the set 506 on the initial state 126). Each transition may be associated with a different target page in this example.

Figure 6:
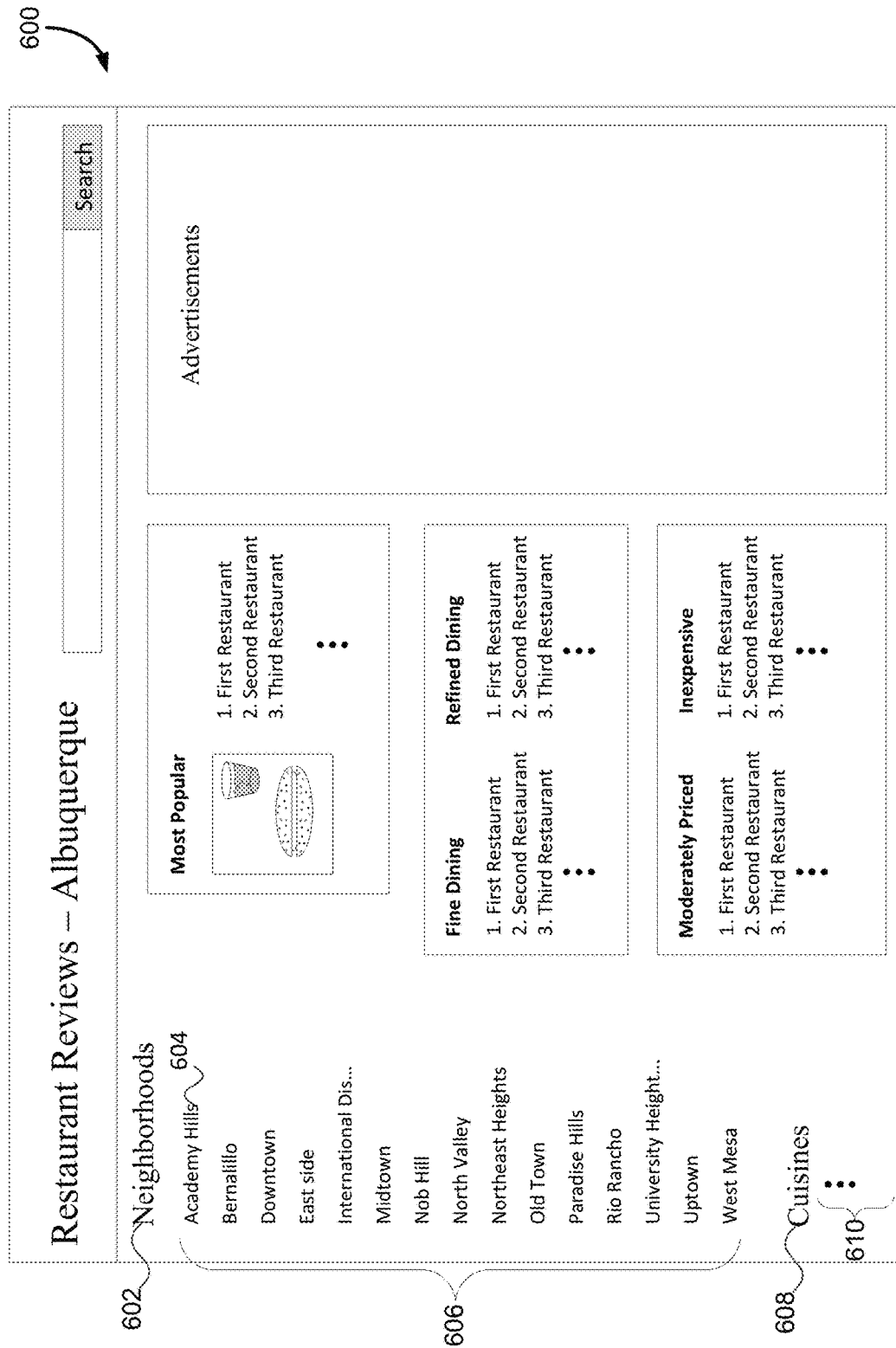
FIG. 6 is a depiction of an intermediate state linked to a plurality of other intermediate states in some embodiments.

FIG. 6 is a depiction 600 of an intermediate state 128 linked to a plurality of other intermediate states in some embodiments. Intermediate state 128 includes links to pages associated with neighborhoods which are further linked to restaurant reviews for restaurants in the neighborhoods.

Subject title 602 identifies the types of links on the intermediate state 128. Links 606 are links (e.g., interactive elements) towards restaurant reviews for restaurants in different neighborhoods. For example, link 604 is a link to a page linked to restaurant reviews for restaurants in the neighborhood of Academy Hills in Albuquerque, N. Mex. In various embodiments, the intermediate state 128 may include different subject titles associated with different interactive elements (e.g., Cuisines 608 followed by links 610 to different reviews organized by cuisine).

Some links on a page may not be a part of the navigation instructions because the links may lead to the same target page. For example, a Mexican restaurant review in Academy Hills may be ultimately accessible by both the Academy Hills link and a Mexican link under Cuisines 608. In order to avoid unnecessary navigation and/or scraping, the navigation instructions may include instructions for a limited number of paths (e.g., one) to each target state 130.

In some embodiments, a transition may be defined as a clicking action on one of the links of the set of interactive elements 606 (e.g., link 604). As similarly discussed regarding FIG. 5, multiple transitions may be defined as a group (e.g., utilizing xpath or another language) thereby defining a group of transitions (e.g., each transition being a click action of a different link of the set 606 on the intermediate state 128). Each transition may be associated with a different target page in this example.

FIG. 7 is a depiction 700 of another intermediate state 128 linked to a plurality of target states 130 in some embodiments. The other intermediate state 128 includes links to pages of restaurant reviews associated with restaurants in a neighborhood (i.e., Academy Hills).

Subject title 702 identifies the types of links on this intermediate state 128. Links 706 are links (e.g., interactive elements) to restaurant reviews for restaurants in the Academy Hills neighborhood of Albuquerque, N. Mex. The set of links 706 include links to different restaurant reviews 704a-704i. There may be any number of links.

In some embodiments, a transition may be defined as a clicking action on one of the links of the set of interactive elements 706 (e.g., link 704a). As similarly discussed regarding FIGS. 5 and 6, multiple transitions may be defined as a group (e.g., utilizing xpath or another language) thereby defining a group of transitions (e.g., each transition being a click action of a different link of the set 706 on the intermediate state 128 to a different target state 130).

FIG. 8 is a graphical user interface 800 for generating navigation instructions in some embodiments. The graphical user interface 800 may allow a user and/or an automated process to define or identify states, interactive elements, and/or transitions to create paths to target states 130. In some embodiments, the graphical user interface 800 utilizes a visual programming language for building a state machine to generate navigation instructions.

In this example, a Groupon website may be navigated to access restaurant deals. The seed page may be a state list page including a listing of links identifying states for the user to select. Each link may be coupled to a page that includes links to a city page for the selected state. Each link on the city page may be coupled to any number of restaurant deals for restaurants in that city.

In some embodiments, a user or automated process identifies the initial state 126 (e.g., a seed page). The initial state 126 may be selected from a plurality of initial states.

The graphical user interface 800 may identify the initial state 126 (e.g., the state-list) as a first node. The first node is coupled to a second node (e.g., city node 808) via transition 804 between segments 806 and 810. In this example, the transition 804 identifies an action associated with a link in the state-list page which may allow navigation to the city page.

The graphical user interface 800 may identify the city page (e.g., the intermediate state 128) as the second node (i.e., city node 808). The second node is coupled to a third node (e.g., rest deal node 816) via transition 812 between segments 814 and 818. In this example, the transition 812 identifies an action associated with a link in the city page which may allow navigation to the rest deal (restaurant deals in the city) page. The rest deal node 816 is identified as a double circle in this example to signify that the rest deal node 816 is a target state 130.

There may be any number of links on the state list page to any number of city pages. The transition 804 may include any number of transitions (e.g., similar actions for each interactive element of the state list node 802) to allow navigation to intermediate state 128 (represented as a single city node 808).

Similarly, there may be any number of links on the city page to any number of restaurant deals pages. The transition 812 may include any number of transitions (e.g., similar actions for each interactive element of the city node 808) to navigate to a different target state 130 (e.g., rest deal node 816).

In various embodiments, the graphical user interface 800 may be utilized to correct errors caused by changes to one or more web pages or network files over time. For example, the focused crawler module 114 may indicate when a transition has not been successful (e.g., the interactive element has changed and, as a result, the transition failed or an incorrect page was reached such as when a target state 130 was expected but not found). A user or software process may receive a notification of the failure and retrieve the navigation instructions associated with the notification for graphical display on the graphical user interface 800.

The graphical user interface 800 may, in some embodiments, provide the notification and/or otherwise indicate the failure (e.g., utilizing text, language codes, colors, and/or the like). The user or automated process may then check each step of the path (e.g., the initial state 126 such as state-list node 802, transition(s) and interactive elements 804, intermediate node 128 such as city node 808, transition(s) and interactive elements 812, and target state 130 such as rest deal node 816). This process may be utilized for all for methodical correction of changes to network and/or websites over time.

Further, in some embodiments, each transition may represent a group of transitions to different web pages. As a result, if a web site changes interactive elements or adds pages, all of the transitions defined in the graphical user interface 800 may change. By identifying the problem and correcting one transition to find the correct target state 130, similar changes may be made to the group of transitions as described herein.

The pull down indicators in the graphical user interface 800 may allow for more information (e.g., identification and/or definitions) associated with each node. For example, the phase:state-list 820 indicator will show transition: q1 822. The phase:city 824 indicator will show transition q2 826. The phase:rest deal 828 indicator is active and elements of the rest deal node 816 are depicted in the graphical user interface 800 under properties 830. Identification and definition section 832 allows for defining and/or identifying nodes and/or transitions.

FIG. 9 is a flowchart for rendering GUI objects of a graph for generating navigation instructions in some embodiments. In step 902, the graphical user interface 800 (e.g., the user interface module 110 of the focused crawl system 102 depicted in FIG. 1), receives a definition or identification of a first state. In this example, the first state (e.g., seed state or initial state 126) may include a listing of states associated with restaurant deals (e.g., target states 130).

In step 904, the graphical user interface 800 renders the first state as a first state GUI object (e.g., a node). The GUI object can be any shape, color, animation, sound, or the like.

In step 906, the graphical user interface 800 receives a definition of a first transition (e.g., transition 804) associated with the first state GUI object that provides or assists in providing a link to a second state such as an intermediate state 128. The first transition may identify any number of interactive elements associated with the first state and actions to be taken utilizing at least one of the interactive elements to navigate to the intermediate state 128 (e.g., a cities page which may include a list of links to restaurant deals for each city).

In step 908, the graphical user interface 800 may render the first transition GUI object coupled to the first state GUI object. The first transition GUI object may represent the first transition definition. The GUI object can be any shape, color, animation, sound, or the like. In one example, the first transition GUI object is depicted as a square coupled to the state-list node 802 and the cities node 808 by two segments 806 and 810.

In step 910, the graphical user interface 800 optionally receives a definition or identification of a second state. In this example, the second state (e.g., intermediate state 128) may include a listing of cities associated with restaurant deals (e.g., target states 130).

In step 912, the graphical user interface 800 renders the second state as a second state GUI object (e.g., a node) which may be similarly or dissimilarly shaped to the first state GUI object.

In step 914, the graphical user interface 800 receives a definition of a second transition (e.g., transition 812) associated with the second state GUI object that provides or assists in providing a link to a third state such as an target state 130. The second transition may identify any number of interactive elements associated with the second state and actions to be taken utilizing at least one of the interactive elements to navigate to the target state 130 (e.g., restaurant deals 816).

In step 916, the graphical user interface 800 may render the second transition GUI object coupled to the second state GUI object. The second transition GUI object may represent the second transition definition and may be similarly or dissimilarly shaped to the first transition GUI object. In one example, the second transition GUI object is depicted as a square coupled to the city node 808 and the rest deal node 816 by two segments 814 and 818.

In step 918, the graphical user interface 800 optionally receives a definition of a target state 130 (e.g., rest deal 816). In step 920, the graphical user interface 800 renders the target state as a target state GUI object coupled to the second transition object (e.g., via segment 818). The target shape GUI object (e.g., a node) may be similarly or dissimilarly shaped to the first and/or second state GUI object.

In step 922, the graphical user interface 800 stores the states and transitions as paths to the target states. The graphical user interface 800 may store the information as navigation instructions. In various embodiments, the graphical user interface 800 stores the graph.

FIG. 10 is a block diagram of an exemplary digital device 1000. The digital device 1000 comprises a processor 1002, a memory system 1004, a storage system 1006, a communication network interface 1008, an I/O interface 1010, and a display interface 1012 communicatively coupled to a bus 1014. The processor 1002 is configured to execute executable instructions (e.g., programs). In some embodiments, the processor 1002 comprises circuitry or any processor capable of processing the executable instructions.

The memory system 1004 is any memory configured to store data. Some examples of the memory system 1004 are storage devices, such as RAM or ROM. The memory system 1004 can comprise the cache memory. In various embodiments, data is stored within the memory system 1004. The data within the memory system 1004 may be cleared or ultimately transferred to the storage system 1006.

The storage system 1006 is any storage configured to retrieve and store data. Some examples of the storage system 1006 are flash drives, hard drives, optical drives, and/or magnetic tape. The storage system 1006 may comprise non-transitory media. In some embodiments, the digital device 1000 includes a memory system 1004 in the form of RAM and a storage system 1006 in the form of flash data. Both the memory system 1004 and the storage system 1006 comprise computer readable media which may store instructions or programs that are executable by a computer processor including the processor 1002.

The communication network interface (com. network interface) 1008 can be coupled to a network (e.g., network 108) via the link 1016. The communication network interface 1008 may support communication over an Ethernet connection, a serial connection, a parallel connection, or an ATA connection, for example. The communication network interface 1008 may also support wireless communication (e.g., 802.11 a/b/g/n, WiMax). It will be apparent to that the communication network interface 1008 can support many wired and wireless standards.

The optional input/output (I/O) interface 1010 is any device that receives input from the user and output data. The optional display interface 1012 is any device that is configured to output graphics and data to a display. In one example, the display interface 1012 is a graphics adapter. It will be appreciated that not all digital devices 1000 comprise either the I/O interface 1010 or the display interface 1012.

The hardware elements of the digital device 1000 are not limited to those depicted in FIG. 10. A digital device 1000 may comprise more or less hardware elements than those depicted. Further, hardware elements may share functionality and still be within various embodiments described herein. In one example, encoding and/or decoding may be performed by the processor 1002 and/or a co-processor, such as a processor located on a graphics processing unit (GPU).

The above-described functions and components can be comprised of instructions that are stored on a storage medium such as a computer readable medium (e.g., a non-transitory computer readable medium). The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention.

The present invention is described above with reference to exemplary embodiments. Various modifications may be made and other embodiments can be used without departing from the broader scope of the present invention. Therefore, these and other variations upon the exemplary embodiments are intended to be covered by the present invention.

The invention claimed is:

1. A focused crawler system comprising:
   a user interface module, implemented by a first one or more processors, configured to, in response to user input:
   (i) from an initial web page including a plurality of interactive elements for providing a transition from the initial web page to a target web page with a user input, identify a group of similar ones of the plurality of interactive elements corresponding to target web pages, respectively, the target web pages having information displayed in the same location on all of the target web pages,
   wherein the information displayed in the same location on all of the target web pages includes an interactive element selected by the user input among the plurality of interactive elements of the initial web page, and
   wherein each of the plurality of interactive elements in the initial web page includes a link for transitioning to each of the plurality of target web pages, and wherein the user input includes a click input, by an input means, for the at least one of the plurality of interactive elements; and
   (ii) generate a set of transitions,
   wherein the set of transitions defines respective paths to the target web pages from the initial web page, and
   wherein each transition of the set of transitions is generated based on one or more user interactions with one or more interactive elements to navigate from (a) the initial web page to (b) one of the target web pages;
   a navigation instruction generation module, implemented by a second one or more processors, configured to generate navigation instructions based on the target web pages and the set of transitions;
   a focused crawler module, implemented by a third one or more processors, configured to navigate to each of the target web pages from the initial web page by following the navigation instructions; and
   a scraper module, implemented by a fourth one or more processors, configured to copy information from each of the target web pages in response to the focused crawler module navigating to the respective target web pages.

2. The system of claim 1 wherein each of the target web pages is a web page at a particular time.

3. The system of claim 1 wherein the user interface module utilizes a graphical user interface (GUI) and generates the set of transitions based on user interactions with the GUI.

4. The system of claim 3 wherein each of the target web pages is represented as a GUI object and wherein each transition is represented as being coupled to at least two GUI objects.

5. The system of claim 1 wherein at least one of the transitions of the set of transitions comprises at least two transitions defining at least one interaction with different interactive elements at one web page.

6. The system of claim 1 wherein the scraper module is configured to copy a subset of information from each of the target web pages.

7. The system of claim 1 further comprising a crawler control module configured to control the focused crawler module to provide confidence that visits to at least one web page does not exceed a limit threshold.

8. The system of claim 1 wherein the navigation instruction generation module stores the generated navigation instructions for later retrieval to provide to the focused crawler module.

9. The system of claim 1 further comprising controlling the navigation to the target web page based on the navigation instructions to provide confidence that visits to at least one web page does not exceed a limit threshold.

10. The system of claim 1 wherein the first one or more processors and the second one or more processors are the same one or more processors.

11. A method comprising:
   by a first one or more processors, in response to user input:
   (i) from an initial web page including a plurality of interactive elements for providing a transition from the initial web page to a target web page with a user input, identifying a group of similar ones of the plurality of interactive elements corresponding to target web pages, respectively, the target web pages having information displayed in the same location on all of the target web pages,
   wherein the information displayed in the same location on all of the target web pages includes an interactive element selected by the user input among the plurality of interactive elements of the initial web page, and
   wherein each of the plurality of interactive elements in the initial web page includes a link for transitioning to each of the plurality of target web pages, and wherein the user input includes a click input, by an input means, for the at least one of the plurality of interactive elements; and
   (ii) generating a set of transitions,
   wherein the set of transitions defines respective paths to the target web pages from the initial web page, and
   wherein each transition of the set of transitions is generated based on one or more user interactions with one or more interactive elements to navigate from (a) the initial web page to (b) one of the target web pages;

generating, by a second one or more processors, navigation instructions based on the target web pages and the set of transitions;

navigating, by a third one or more processors, to each of the target web pages from the initial web page by following the navigation instructions; and copying, by a fourth one or more processors, information from each of the target web pages in response to navigating to the respective target web pages.

12. The method of claim 11 wherein each of the target web pages is a web page at a particular time.

13. The method of claim 11 wherein generating the set of transitions comprises utilizing a graphical user interface (GUI) and generating the set of transitions based on user interactions with the GUI.

14. The method of claim 13 wherein each of the target web pages is represented as a GUI object and wherein each transition is represented as being coupled to at least two GUI objects.

15. The method of claim 11 wherein at least one of the transitions of the set of transitions comprises at least two transitions defining at least one interaction with different interactive elements at one web page.

16. The method of claim 11 wherein copying information from the target web pages comprises copying a subset of information from each of the target web pages.

17. The method of claim 11 further comprising storing the navigation instructions for later retrieval for navigating, by the third one or more processors, from the initial web page to the target web page by following the navigation instructions.

18. A non-transitory computer-readable medium comprising executable instructions, the instructions being executable by a processor to perform a method, the method comprising:

in response to user input:

(i) from an initial web page including a plurality of interactive elements for providing a transition from the initial web page to a target web page with a user input, identifying a group of similar ones of the plurality of interactive elements corresponding to target web pages, respectively, the target web pages having information displayed in the same location on all of the target web pages, wherein the information displayed in the same location on all of the target web pages includes an interactive element selected by the user input among the plurality of interactive elements of the initial web page, and wherein each of the plurality of interactive elements in the initial web page includes a link for transitioning to each of the plurality of target web pages, and wherein the user input includes a click input, by an input means, for the at least one of the plurality of interactive elements; and (ii) generating a set of transitions, wherein the set of transitions defines respective paths to the target web pages from the initial web page, and wherein each transition of the set of transitions is generated based on one or more user interactions with one or more interactive elements to navigate from (a) the initial web page to (b) one of the target web pages;

generating navigation instructions based on the target web pages and the set of transitions;

navigating to each of the target web pages from the initial web page by following the navigation instructions; and copying information from each of the target web pages in response to navigating to the respective target web pages.

19. The method of claim 11 wherein the first one or more processors and the second one or more processors are the same one or more processors.

* * * * *